United States Patent
Ji et al.

(10) Patent No.: US 8,036,241 B2
(45) Date of Patent: Oct. 11, 2011

(54) METHOD AND SYSTEM FOR CONTENTION RESOLUTION IN TELECOMMUNICATION NETWORKS

(75) Inventors: Baowei Ji, Plano, TX (US); William Joseph Semper, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 266 days.

(21) Appl. No.: 11/684,412

(22) Filed: Mar. 9, 2007

(65) Prior Publication Data

US 2008/0219286 A1 Sep. 11, 2008

(51) Int. Cl.
*H04J 3/17* (2006.01)

(52) U.S. Cl. .......................... 370/443; 370/329; 370/437

(58) Field of Classification Search .................. 370/329, 370/437, 443
See application file for complete search history.

(56) References Cited

U.S. PATENT DOCUMENTS

| | | | |
|---|---|---|---|
| 2004/0028015 A1* | 2/2004 | Fouilland et al. | 370/337 |
| 2005/0272403 A1* | 12/2005 | Ryu et al. | 455/403 |
| 2007/0249341 A1* | 10/2007 | Chu et al. | 455/434 |
| 2008/0089279 A1* | 4/2008 | Hu et al. | 370/329 |
| 2008/0089280 A1* | 4/2008 | Hu | 370/329 |
| 2008/0089389 A1* | 4/2008 | Hu | 375/132 |
| 2008/0090581 A1* | 4/2008 | Hu | 455/452.1 |
| 2008/0108366 A1* | 5/2008 | Hu | 455/452.1 |
| 2008/0165754 A1* | 7/2008 | Hu | 370/342 |

OTHER PUBLICATIONS

Leon-Garcia & Widjaja, "Communication Networks, Fundamental Concepts and Key Architectures", 2004, McGraw-Hill, 2nd Ed., pp. 278-284, 457-458.*

* cited by examiner

*Primary Examiner* — Huy Vu
*Assistant Examiner* — Maria Sekul

(57) ABSTRACT

A method and system for contention resolution in a communications network are disclosed. As one example, a method for contention resolution in a communications network is disclosed. The method includes the steps of transmitting a first contention message during a first time interval, determining if a second contention message has been received during the first time interval, if the second contention message has been received during the first time interval, deferring a use of a network resource in the communications network, and if the second contention message has not been received during the first time interval, using the network resource during a second time interval.

19 Claims, 11 Drawing Sheets

| (MSB) | | | BIT POSITION | | | | (LSB) | OCTET NUMBER |
|---|---|---|---|---|---|---|---|---|
| 0 | 1 | 2 | 3 | 4 | 5 | 6 | 7 | |
| PROTOCOL ID=01H (BS SYNCH) |||||||| 1 |
| MESSAGE ID=03H (CHANNEL USE REQUEST) |||||||| 2 |
| SENDING BS ID=[00 00 00 00H-FF FF FF FFH] |||||||| 3 |
| |||||||| 4 |
| |||||||| 5 |
| |||||||| 6 |
| SYNCHRONIZATION CODE=[01H-FFH] |||||||| 7 |
| ELEMENT ID=07H (CHANNEL/TIME SLOT LIST) |||||||| 8 |
| NUMBER OF ENTRIES = [01H-FFH] |||||||| 9 |
| { |||||||| |
| CHANNEL ID=[01H-FFH] |||||||| K |
| TIME SLOT ID=[01H-FFH] |||||||| K+1 |
| }(NUMBER OF ENTRIES) |||||||| |

*FIG.7A*

| (MSB) | | | BIT POSITION | | | | (LSB) | OCTET NUMBER |
|---|---|---|---|---|---|---|---|---|
| 0 | 1 | 2 | 3 | 4 | 5 | 6 | 7 | |
| PROTOCOL ID=01H (BS SYNCH) |||||||| 1 |
| MESSAGE ID=04H (CHANNEL USE RESPONSE) |||||||| 2 |
| SENDING BS ID=[00 00 00 00H-FF FF FF FFH] |||||||| 3 |
| |||||||| 4 |
| |||||||| 5 |
| |||||||| 6 |
| SYNCHRONIZATION CODE=[01H-FFH] |||||||| 7 |
| ELEMENT ID=07H (CHANNEL/TIME SLOT LIST) |||||||| 8 |
| NUMBER OF ENTRIES = [01H-FFH] |||||||| 9 |
| { |||||||| |
| CHANNEL ID=[01H-FFH] |||||||| K |
| TIME SLOT ID=[01H-FFH] |||||||| K+1 |
| }(NUMBER OF ENTRIES) |||||||| |

*FIG.7B*

| (MSB) | | | BIT POSITION | | | | (LSB) | OCTET NUMBER |
|---|---|---|---|---|---|---|---|---|
| 0 | 1 | 2 | 3 | 4 | 5 | 6 | 7 | |
| PROTOCOL ID=01H (BS SYNCH) | | | | | | | | 1 |
| MESSAGE ID=05H (CHANNEL USE UPDATE) | | | | | | | | 2 |
| SENDING BS ID=[00 00 00 00H–FF FF FF FFH] | | | | | | | | 3 |
| | | | | | | | | 4 |
| | | | | | | | | 5 |
| | | | | | | | | 6 |
| SYNCHRONIZATION CODE=[01H–FFH] | | | | | | | | 7 |
| ELEMENT ID=07H (CHANNEL/TIME SLOT LIST) | | | | | | | | 8 |
| NUMBER OF ENTRIES = [01H–FFH] | | | | | | | | 9 |
| { | | | | | | | | |
| CHANNEL ID=[01H–FFH] | | | | | | | | K |
| TIME SLOT ID=[01H–FFH] | | | | | | | | K+1 |
| }(NUMBER OF ENTRIES) | | | | | | | | |

*FIG. 7C*

| (MSB) | | | BIT POSITION | | | | (LSB) | OCTET NUMBER |
|---|---|---|---|---|---|---|---|---|
| 0 | 1 | 2 | 3 | 4 | 5 | 6 | 7 | |
| PROTOCOL ID=01H (BS SYNCH) | | | | | | | | 1 |
| MESSAGE ID=06H (CHANNEL USE UPDATE ACK) | | | | | | | | 2 |
| SENDING BS ID=[00 00 00 00H–FF FF FF FFH] | | | | | | | | 3 |
| | | | | | | | | 4 |
| | | | | | | | | 5 |
| | | | | | | | | 6 |
| SYNCHRONIZATION CODE=[01H–FFH] | | | | | | | | 7 |

*FIG. 7D*

| (MSB) | | BIT POSITION | | | | | (LSB) | OCTET NUMBER |
|---|---|---|---|---|---|---|---|---|
| 0 | 1 | 2 | 3 | 4 | 5 | 6 | 7 | |
| PROTOCOL ID=01H (BS SYNCH) | | | | | | | | 1 |
| MESSAGE ID=01H (SPECTRUM USE NOTIFICATION) | | | | | | | | 2 |
| SENDING BS ID=[00 00 00 00H-FF FF FF FFH] | | | | | | | | 3 |
| | | | | | | | | 4 |
| | | | | | | | | 5 |
| | | | | | | | | 6 |
| SYNCHRONIZATION CODE=[01H-FFH] | | | | | | | | 7 |
| ELEMENT ID=01H (ACTIVE CHANNEL LIST) | | | | | | | | J |
| NUMBER OF ENTRIES = [01H-FFH] | | | | | | | | J+1 |
| { | | | | | | | | |
| CHANNEL ID=[01H-FFH] | | | | | | | | K |
| } (NUMBER OF ENTRIES) | | | | | | | | |
| ELEMENT ID=02H (CANDIDATE CHANNEL LIST) | | | | | | | | L |
| NUMBER OF ENTRIES=[01H-FFH] | | | | | | | | L+1 |
| { | | | | | | | | |
| CHANNEL ID=[01H-FFH] | | | | | | | | M |
| } (NUMBER OF ENTRIES) | | | | | | | | |
| ELEMENT ID=03H (RESERVATION REQUEST) | | | | | | | | N |
| NUMBER OF ENTRIES=[01H-FFH] | | | | | | | | N+1 |
| { | | | | | | | | |
| CHANNEL ID=[01H-FFH] | | | | | | | | P |
| } (NUMBER OF ENTRIES) | | | | | | | | |
| ELEMENT ID=04H (RESERVATION REVOKE) | | | | | | | | Q |
| NUMBER OF ENTRIES=[01H-FFH] | | | | | | | | Q+1 |
| { | | | | | | | | |
| CHANNEL ID=[01H-FFH] | | | | | | | | Q |
| } (NUMBER OF ENTRIES) | | | | | | | | |

*FIG.9A*

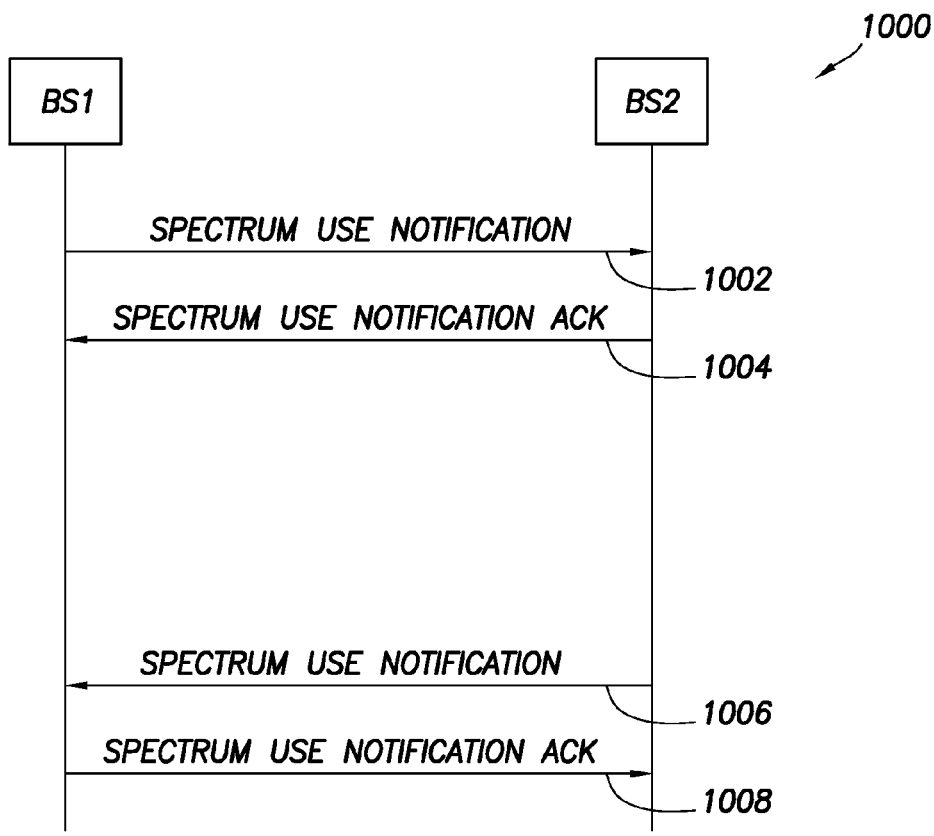
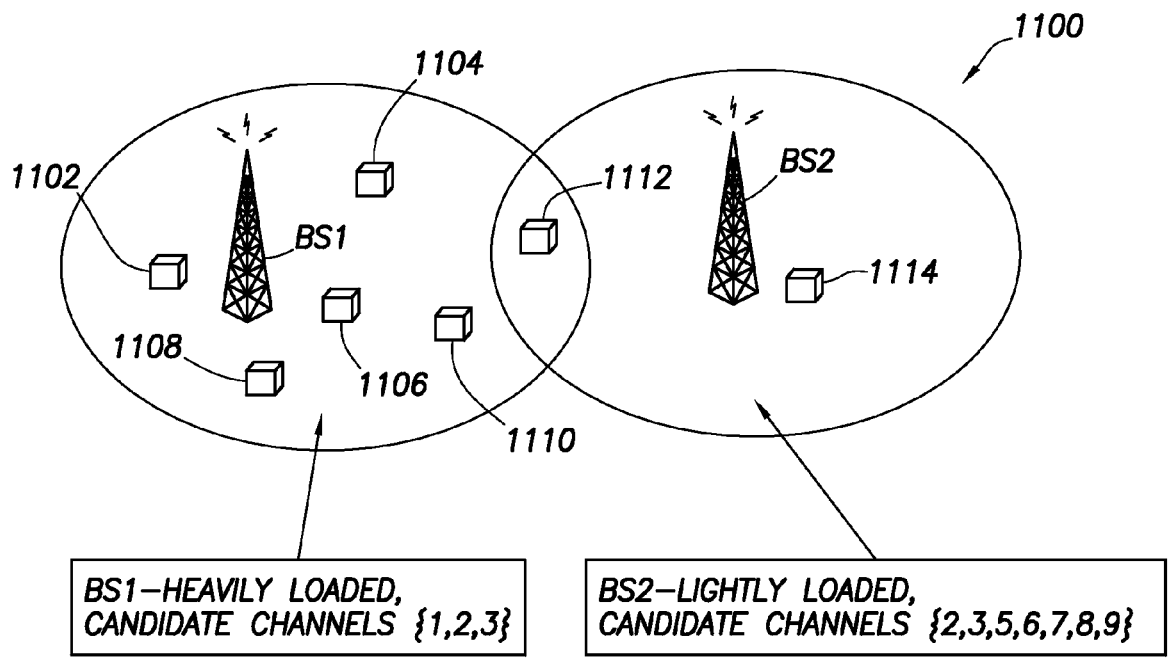

METHOD AND SYSTEM FOR CONTENTION RESOLUTION IN TELECOMMUNICATION NETWORKS

FIELD OF THE INVENTION

The invention relates to the telecommunications field, and more particularly, but not exclusively, to a method and system for contention resolution in telecommunication networks.

BACKGROUND OF THE INVENTION

In the telecommunications field, contention is a problematic condition that arises when two or more devices attempt to use the same network resource at the same time. For example, contention arises when two network devices attempt to transmit over a shared channel at the same time. Contention resolution is the process of deciding which device can access the network resource first.

In existing telecommunication networks, contention resolution is accomplished in numerous ways. For example, Carrier Sense Multiple Access with Collision Detection (CSMA/CD) is a shared-medium contention resolution scheme typically used in Ethernet networks. Basically, with CSMA/CD, as a user (device) is transmitting a packet, that user also measures the energy level of the transmission medium at the same time. If any user determines that one or more other user(s) is also transmitting packets, all of the users terminate their transmissions, and wait a random amount of time (known as back-off delay) before attempting to transmit again.

CSMA with Collision Avoidance (CSMA/CA) is another shared-medium contention resolution scheme typically used in wireless communication networks (e.g., WLANs, Wi-Fi, etc.). With CSMA/CA, when a user (device) wants to transmit a packet, that user first has to listen to the channel for a predetermined amount of time, in order to check for any activity on the channel. If the user determines that the channel is idle, then that user is allowed to transmit. If the user determines that the channel is busy (a second user is transmitting a packet), then the first user has to defer its transmission.

Notwithstanding the numerous advantages of the CSMA/CD and CSMA/CA contention resolution schemes, there are numerous contention situations where these schemes are not applicable. For example, both CSMA/CD and CSMA/CA are not applicable if the devices in contention for the same network resources are incapable of hearing each other.

A typical situation that arises, in which CSMA/CD and CSMA/CA are not applicable contention resolution schemes, is where two (or more) Base Stations (BSs) are contending for spectrum ownership, and each BS is located outside of the other's radio coverage area. In this case, the contending BSs are unable to hear each other, and CSMA/CA for contention resolution is not a viable approach. Also, in this case, the contending BSs are not located within one Ethernet network, so CSMA/CD for contention resolution is also not a viable approach. Notably, for Cognitive Radio-based (CR-based) network designs (IEEE 802.22 standard) with dynamic frequency selection, this situation raises a legitimate concern.

Specifically, in CR-based networks using dynamic frequency selection, each BS is designed to cover a distance that corresponds to the radius of one cell (i.e., not the double-radius distance between two neighbor BSs). Consequently, in CR-based networks with dynamic frequency selection, the ability to establish direct wireless links between neighbor BSs is not guaranteed. Also, in CR-based networks with dynamic frequency selection, the use of CSMA/CD for contention resolution is not a viable approach. For example, availability and reliability design requirements impose limitations on carrier sensing distances in the Ethernet networks involved. These limits are generally much smaller than the direct distances between neighbor BSs. As a practical matter, these limits are even smaller due to the signal propagation effects of various terrains.

In this regard, FIG. 1 is a diagram of an example CR-based network 100, which illustrates a related problem of determining how to resolve contention if a wireless or wireline network resource is not to be directly shared. Referring to FIG. 1, assume that there is only one channel (e.g., television channel) available at a certain time, and a time-division channel sharing scheme is to be used. However, if the BSs 102, 104 and 106 in network 100 are unable to communicate and coordinate with each other directly over the air, then the CPEs 108-118 in network 100 will experience inter-cell interference, and the time-division channel sharing scheme will fail. Consequently, the BSs 102, 104, 106 will have to be able to communicate and coordinate with each other in some way, in order to resolve the time-division channel sharing contention issues involved. Therefore, there is a pressing need for a contention resolution technique that can be used in wireless or wireline telecommunication networks if the devices in contention are unable to communicate with each other, and CSMA/CD and CSMS/CA are also not applicable contention resolution techniques.

Additionally, inefficiency is a contention-related problem that arises when two or more devices use the same network resource at the same time. For example, in conventional wireless communication networks, the BSs typically assign frequency channels to users on an as-needed basis from dedicated radio spectrum purchased by the network operators. However, there is a substantial amount of unused radio spectrum that could be used, if the networks could recognize that the channels are available and then assign the unused channels to the users involved. A practical illustration of this problem involves the use of idle television channels.

The IEEE 802.22 Working Group on Wireless Regional Area Networks (WRANs) is developing the specifications for a fixed point-to-multipoint WRAN that will utilize specific television channels and guard bands for communications in the UHF and VHF television bands. A primary goal of the Working Group is to develop the standard for a CR-based Physical Layer/Medium Access Control (PHY/MAC) air interface for use by license-exempt wireless communication devices on a non-interfering basis in a frequency spectrum allocated for broadcast television. Essentially, the broadcast television spectrum is divided up into numerous channels, but many of these channels remain unused for long periods of time. However, using CR-based techniques, it is now possible to deploy a WRAN that can allocate portions of the unused television spectrum to Customer Premises Equipment (CPE) for use during a set period of time. The WRAN can allocate these unused television channels in such a way that broadcasts on these channels will not interfere with broadcasts by the stations that normally use the television spectrum.

In certain CR-based network configurations, a WRAN may include a plurality of BSs, and each BS in the WRAN has a radio coverage area that may include several cells and sectors. Thus, the WRAN can be designed to cover an entire metropolitan area with a network of BSs. However, notwithstanding the advantages of such a network configuration, a number of significant contention-related problems exist in this regard.

For example, the radio coverage areas of numerous BSs in the WRAN may overlap. The CPEs located within the radio coverage area of a BS are able to determine the strength of the signal received from that BS, by searching for a pilot signal being broadcast by that BS on an idle television channel. Consequently, a CPE located in a region covered by multiple BSs may see several pilot signals at once. As another example, two or more CPEs may be located in close proximity to each other, but each such CPE may be served by a different BS.

Notably, in CR-based network designs, contention issues arise whenever two BSs are allowed to use the same unused television channel. Consequently, it would be advantageous if the BSs were able to share the channel between them. However, in order to share a channel, the BSs have to be synchronized, and they also have to be able to communicate with each other with respect to scheduling the channel for their respective CPEs. In conventional networks, these functions are accomplished for dedicated spectrum deployments, by using network signaling over the air between the BSs involved. However, in WRAN deployments using CR-based methods to sense the unused spectrum, the conventional techniques will require the CPEs to inform each other and the BSs about their channel assignments. Unfortunately, this approach will use up a substantial amount of the valuable television broadcast spectrum for these signaling functions.

Furthermore, in order to avoid interference, it would be advantageous if the BSs did not assign the same channel to the CPEs they are servicing. Thus, the BSs are able to avoid interference if they can keep each other informed about their spectrum allocations. In conventional networks, these functions are accomplished for dedicated spectrum deployments, by using network signaling over the air between the BSs involved, or using pre-assigned frequencies for each BS. However, in WRAN deployments, the conventional techniques will require the CPEs to inform each other and the BSs about their channel assignments. Unfortunately, this approach will use up a substantial amount of the valuable television broadcast spectrum for these signaling functions.

SUMMARY OF THE INVENTION

In a first example embodiment, a method for contention resolution in a communications network is provided. The method includes the steps of transmitting a first contention message during a first time interval, determining if a second contention message has been received during the first time interval, if the second contention message has been received during the first time interval, deferring a use of a network resource in the communications network, and if the second contention message has not been received during the first time interval, using the network resource during a second time interval.

In a second example embodiment, a method for contention resolution in a communications network is provided. The method includes the steps of a first device determining that a channel sharing contention condition exists, generating a random number associated with a predefined duration of a contention window, sending a first messaging packet or frame substantially at the beginning of a contention time slot, the first messaging packet or frame associated with a predetermined probability value, and determining if at least a second messaging packet or frame has been received from a second device substantially at the end of the contention time slot. If the first device determines that the at least a second messaging packet or frame has been received from the second device, the first device defers use of a channel in contention, and if the first device determines that the at least a second messaging packet or frame has not been received from the second device, the first device uses the channel in contention.

In a third example embodiment, a method for coordinating an assignment of frequency channels in a communications network is provided. The method includes the steps of a first base station sending a channel use request message to a second base station, the channel use request message including a request by the first base station to share a channel in use by the second base station, and in response to receiving the channel use request message, the second base station sending a channel use response message to the first base station, the channel use response message including an identity of at least one channel and at least one time slot to be shared with the first base station.

In a fourth example embodiment, a method for coordinating an assignment of frequency channels in a communications network is provided. The method includes the steps of a first base station sending a channel use update message to a second base station, the channel use update message including an identity of at least one time slot or channel that has been released from use by the first base station, and in response to receiving the channel use update message, the second base station sending a channel use update acknowledgment message indicating that the second base station received the channel use update message.

In a fifth example embodiment, a method for coordinating an assignment of frequency channels in a communications network is provided. The method includes the steps of a first base station sending a spectrum use notification message to a second base station, the spectrum use notification message including a request by the first base station for the second base station to reserve at least one channel for use by the first base station, and in response to receiving the spectrum use notification message, the second base station sending a spectrum use notification acknowledgment message to the first base station, the spectrum use notification acknowledgment message including an identity of one or more channels reserved for use by the first base station.

In a sixth example embodiment, a method for coordinating an assignment of frequency channels in a communications network is provided. The method includes the steps of a second base station sending a spectrum use notification message to a first base station, the spectrum use notification message including a request by the second base station for the first base station to revoke a reservation of at least one channel from use by the first base station, and in response to receiving the spectrum use notification message, the first base station sending a spectrum use notification acknowledgment message to the second base station, the spectrum use notification acknowledgment message including an identity of one or more channels that are released from a reservation for use by the first base station.

In a seventh example embodiment, a system for contention resolution in a communications network is provided. The system includes a first base station in the communications network, a second base station in the communications network, a second network, and a plurality of communication links connected to the first base station, the second base station, and the second network. The communication links are coupling the first base station to the second base station for communication. The first base station is configured to transmit a first contention message during a first time interval, determine if a second contention message has been received during the first time interval, if the second contention message has been received during the first time interval, defer a use of a network resource in the communications network, and if the second contention message has not been received during the first time interval, use the network resource during a second time interval.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 7A through 7D are related diagrams depicting example messaging formats, which may be used for coordinating the assignments of communication network resources, in accordance with one or more example embodiments of the present invention;

FIGS. 9A and 9B are related diagrams depicting example messaging formats, which may be used for coordinating the assignments of communication network resources, in accordance with one or more example embodiments of the present invention;

FIG. 10 is a time sequence diagram depicting an example method for coordinating the assignments of communication network resources, in accordance with a second example embodiment of the present invention; and FIG. 11 is a pictorial diagram depicting an example network configuration, which can be used to illustrate the exemplary method shown in FIG. 10.

DETAILED DESCRIPTION OF PREFERRED EMBODIMENT

Essentially, in one example embodiment, a method for contention resolution in telecommunication networks is provided for situations where network devices may not be able to hear each other, and CSMA/CD and CSMA/CA are not applicable contention resolution techniques. However, this method may also be used in telecommunication networks where either CSMA/CD or CSMA/CA is an applicable contention resolution scheme.

Figure 1:
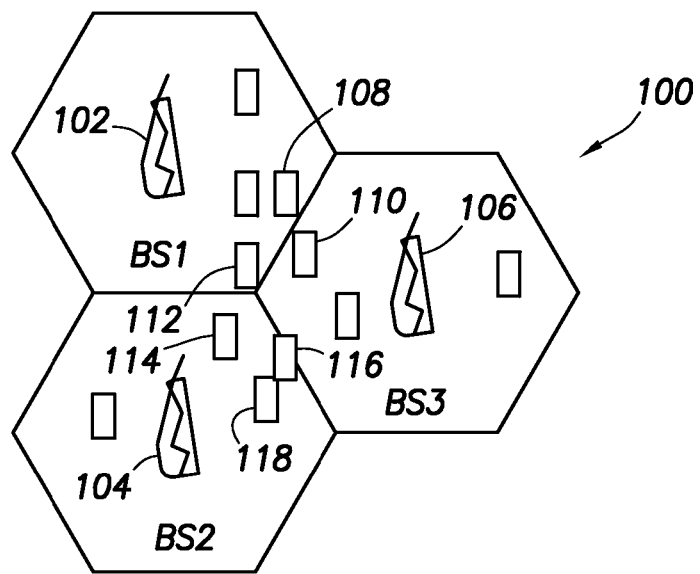
FIG. 1 is a diagram of an example CR-based network, which illustrates the problem of determining how to resolve contention if a wireless or wireline network resource is not to be directly shared.
Figure 2:
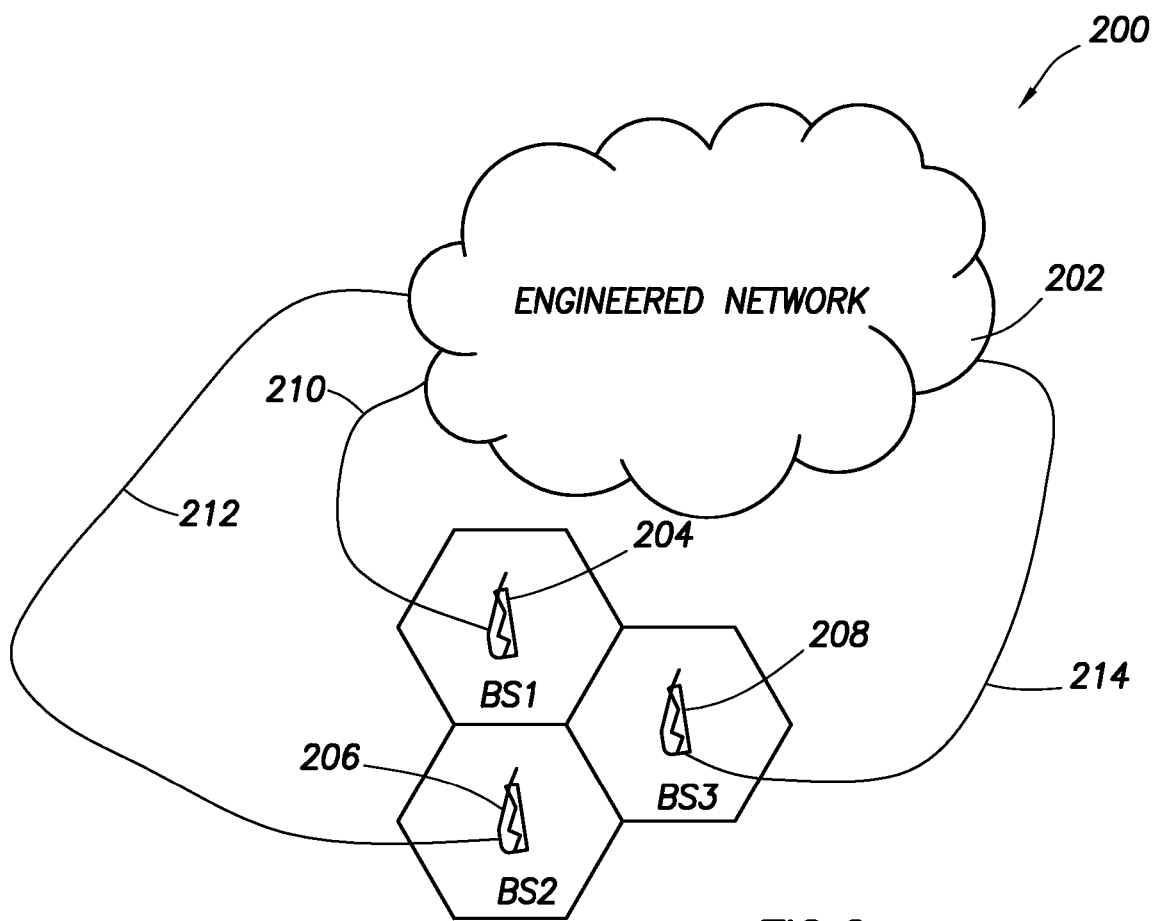
FIG. 2 depicts an example system, which can be used to implement a method for contention resolution, in accordance with one example embodiment of the present invention.

With reference again to the figures, FIG. 2 depicts an example system 200, which can be used to implement a method for contention resolution, in accordance with one example embodiment of the present invention. For this example embodiment, system 200 includes a first network portion 202, and a second network portion composed of a plurality of BSs 204, 206 and 208. System 200 also includes a plurality of communication links 210, 212 and 214, and each communication link 210, 212 and 214 is connected to provide communications between first network portion 202 and a respective BS 204, 206 and 208 in the second network portion. For this example embodiment, network portion 202 is configured so that each communication link 210, 212 and 214 may convey data in accordance with the Internet Protocol (IP). However, it should be understood that the use of IP links to communicate data in system 200 is a design choice, and is not intended to limit the scope of the present invention in any way. As such, any suitable wireline or wireless communications link capable of conveying data between first network portion 202 and each BS 204, 206 and 208 may be used. For example, each communication link 210, 212 and 214 may be implemented with a T1 line, E1 line, fiber optics line, coaxial line, microwave link, radio link, and the like. In any event, for this example embodiment, it may be assumed that first network portion 202 and communication links 210, 212 and 214 provide IP data communication paths between BSs 204, 206 and 208.

For illustrative purposes, in this example embodiment, it may be assumed that there is no central controller available that decides which device owns a resource after a contention. In that case, a first-claimed, first-served contention resolution scheme could be used. However, without such a central controller, a technique for acknowledging channel ownership needs to be established. In that regard, it may be assumed that BSs 204, 206 and 208 are neighboring BSs that are contending for ownership of a particular network resource. Specifically, for this example embodiment, it may be assumed that BSs 204, 206 and 208 are contending for the use of a specific frequency channel during a certain time period. Also, it may be assumed that BSs 204, 206 and 208 are communicating within time slots and operating in synchronization. As such, a value, T, may be defined as the maximum one-way transmission delay time between any two of the BSs 204, 206, 208, which includes the propagation and processing delays within first network portion 202 (in a wireline or wireless configuration) and links 210, 212 and 214. Also, the duration of each time slot may be defined as a contention period or window having a time value that is larger than the value of the maximum transmission delay time, T.

Figure 3:
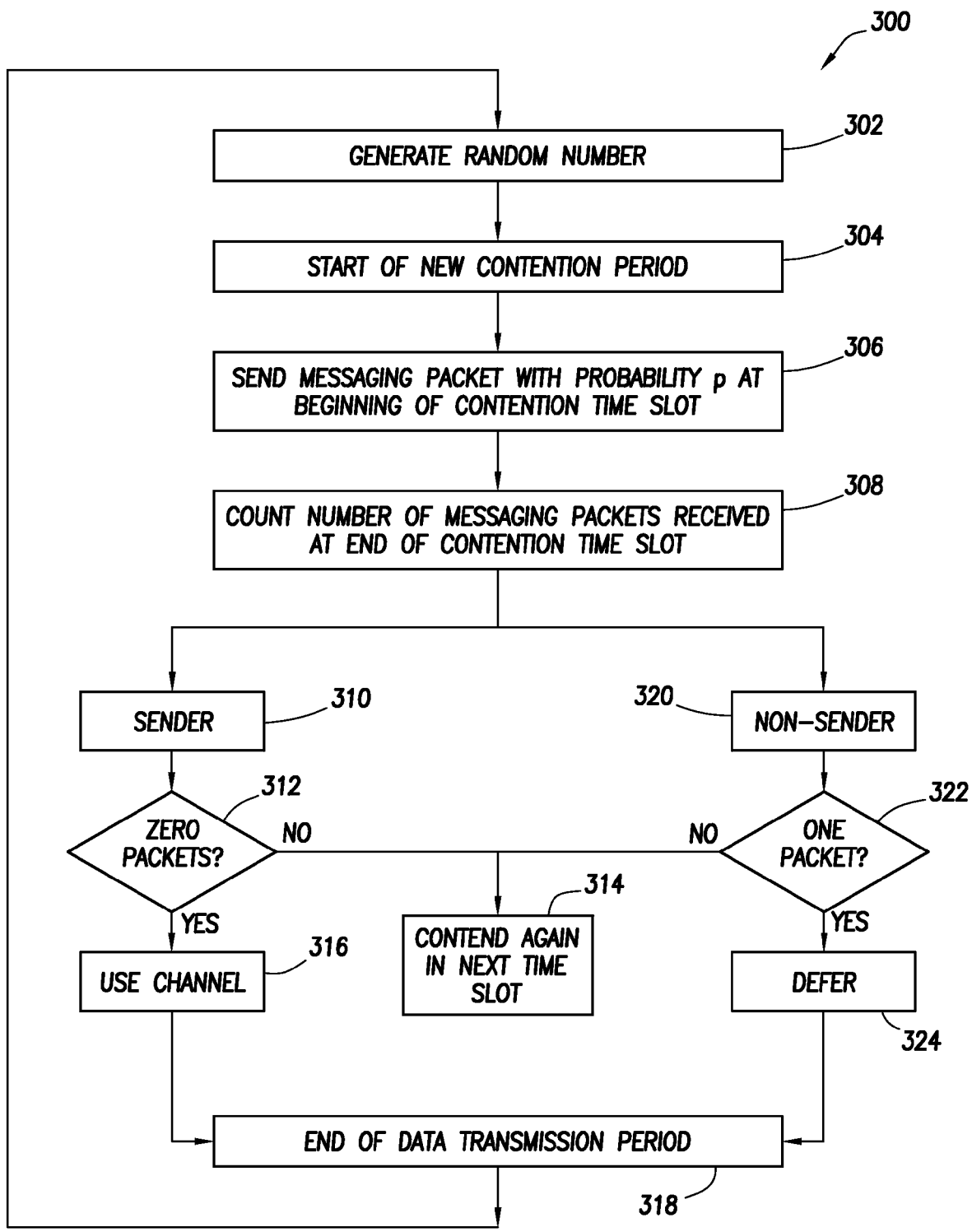
FIG. 3 depicts a flow chart of an example method that may used for contention resolution, in accordance with one example embodiment of the present invention.

FIG. 3 depicts a flow chart of an example method 300 that may used for contention resolution, in accordance with one example embodiment of the present invention. For example, method 300 may be used to implement contention resolution in example system 200 shown in FIG. 2. Referring now to FIGS. 2 and 3 for this example embodiment, method 300 begins when a BS decides to contend for access to a channel, and generates a random number, R (step 302). For this example embodiment, the generated random number, R, is within the range between [0 to CWin−1], where CWin represents the time duration of the contention window involved.

Next, at the beginning of the next contention period (time slot), the contending BS determines if the current value of the random number, R, is equal to zero (step 304). If so, the contending BS sends out a short messaging "claim" packet (e.g., using a multicast transmission) with a probability, p, to all of the other BSs in the contention set (step 306). Otherwise, if the current value of R is not equal to zero, the contending BS decreases the value of R by 1, and waits for the next contention period (time slot). For this example embodiment, the "claim" packet can be conveyed from the contending BS to the other BSs via first network portion 202 and two of the links 210, 212, 214.

Figure 4:
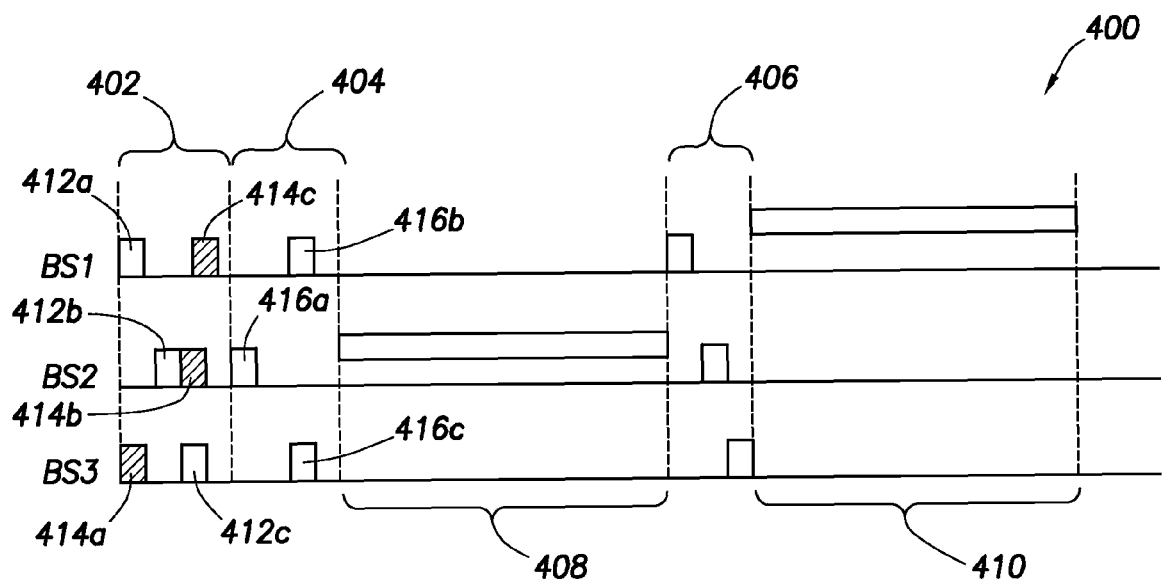
FIG. 4 is a pictorial diagram depicting a plurality of "claim" packet transmissions and receptions that illustrate principles of the exemplary method shown in FIG. 3.

FIG. 4 is a pictorial diagram 400 depicting a plurality of "claim" packet transmissions and receptions that illustrate principles of exemplary method 300 shown in FIG. 3. Referring now to FIGS. 2, 3 and 4 for this illustrative example, BS1, BS2 and BS3 in FIG. 4 may represent BS 204, BS 206 and BS 208, respectively, shown in FIG. 2. Also, a plurality of contention periods (e.g., associated with predetermined time slots) 402, 404, 406 are shown, along with a plurality of "occupation" periods 408, 410. For this illustrative example, during a first contention period/time slot 402, BS1 is transmitting a first "claim" packet 412a, and BS3 is transmitting a second "claim" packet 414a. Thus, in this example, it may be assumed that BS1 and BS3 are attempting to gain access to a specific channel during the same timeframe. Also, during contention period 402, BS1 is shown receiving the "claim" packet 414c transmitted by BS3, and BS3 is receiving the "claim" packet 412c transmitted by BS1. BS2 has not transmitted a "claim" packet, but BS2 is shown receiving the "claim" packets 412b and 414b transmitted, respectively, by BS1 and BS3.

Returning to method 300, each BS in the contention set counts the number of "claim" packets received during the contention period/time slot involved (step 308). For example, during contention period 402, BS1 has received one "claim" packet 414c, BS2 has received two "claim" packets 412b and 414b, and BS3 has received one "claim" packet 412c. Next, each (sender) BS that transmitted a "claim" packet during that contention period/time slot determines whether or not it has received a "claim" packet from another BS (step 310). For example, the sender BS may check to determine if it received no "claim" packets during the contention period (step 312). If the sender BS determines that it received one or more "claim" packets during that contention period, then it may be assumed that a collision of those "claim" packets has occurred. Then, each of the sender BSs that transmitted the colliding "claim" packets generates a new random number, R, for itself, and waits for another contention period to begin (step 314).

Returning to step 312, if the sender BS determines that it received no "claim" packet during the contention period involved, then the sender BS can assume that it has captured the resource (e.g., channel) successfully (step 316). That BS can then use that resource until the end of the data transmission period (occupation period) involved (step 318). The BS then releases the resource and flow returns to step 302.

Returning to step 308, each (non-sender) BS that did not transmit a "claim" packet during the contention period involved, determines whether or not it has received a "claim" packet from another BS (step 320). Specifically, the non-sender BS checks to determine if it received one "claim" packet during the contention period involved (step 322). If the non-sender BS determines that it received one "claim" packet during that contention period/time slot, then the non-sender BS defers its claim, and holds off until the end of the next occupation period (step 324). During the next contention period, that BS then checks again to determine how many "claim" packets it has received, if any, and can repeat steps 320 and 322. However, if (at step 322), that non-sender BS determines that it did not receive one "claim" packet during that contention period, then that BS reduces the value of R by 1, and waits to contend again in the next time slot (step 314). During the next contention period/time slot, that BS can then repeat steps 320 and 322.

The example diagram depicted in FIG. 4 illustrates key principles of exemplary method 300. For example, during contention period/time slot 402, BS1 and BS3 are sender BSs, and BS2 is a non-sender BS. As such, during contention period/time slot 402, sender BS1 has received one "claim" packet from another BS, sender BS3 has also received one "claim" packet from another BS, and non-sender BS2 has received two "claim" packets from other BSs. Consequently, in accordance with method 300, during the next contention period/time slot 404, BS1 and BS3 have not sent out "claim" packets. However, during contention period/time slot 404, BS2 is now a sender BS and has sent out a "claim" packet 416a, BS1 is a non-sender BS and has received the "claim" packet 416b sent by BS2, and BS3 is a non-sender BS and has also received the "claim" packet 416c sent by BS2. Note that, in accordance with method 300, BS2 has captured the channel in contention and used that channel until the end of the occupation period 408. Also note that, during the next contention period/time slot 406, BS1 is a sender BS, and BS2 and BS3 are non-sender BSs. Consequently, in accordance the principles of method 300, BS1 has captured the channel in contention and used that channel until the end of the occupation period 410.

Note that the value of CWin, which is the size of the contention window, is assumed to be fixed for the above-described approach. The rationale for fixing the value of CWin is that if the number of contending devices is known in advance, an appropriate window size can be determined, with an optimal tradeoff between minimizing the probability of collision and avoiding a large contention window size. However, if the number of contending devices is not known, then a binary back-off procedure can be used during the collision detection phase, which can be similar to the back-off procedure used for CSMA/CA and CSMA/CD.

In sum, the example embodiment of method 300 resolves the issue of resource contention, by enumerating the number of "claim" packets received during a contention period. As such, method 300 can be performed independently of conventional contention resolution methods currently being used, such as CSMA/CA, CSMA/CD, and the like. Notably, the novel approach of method 300 can be used to address contention issues in CR-based systems, where neither CSMA/CA nor CSMA/CD is an applicable contention resolution technique. However, it should be understood that method 300 is not limited only to contention resolution between neighboring BSs in CR-based systems or other types of wireless or wireline networks, and can be performed for any suitable system where resource sharing issues need to be resolved.

Figure 5A:
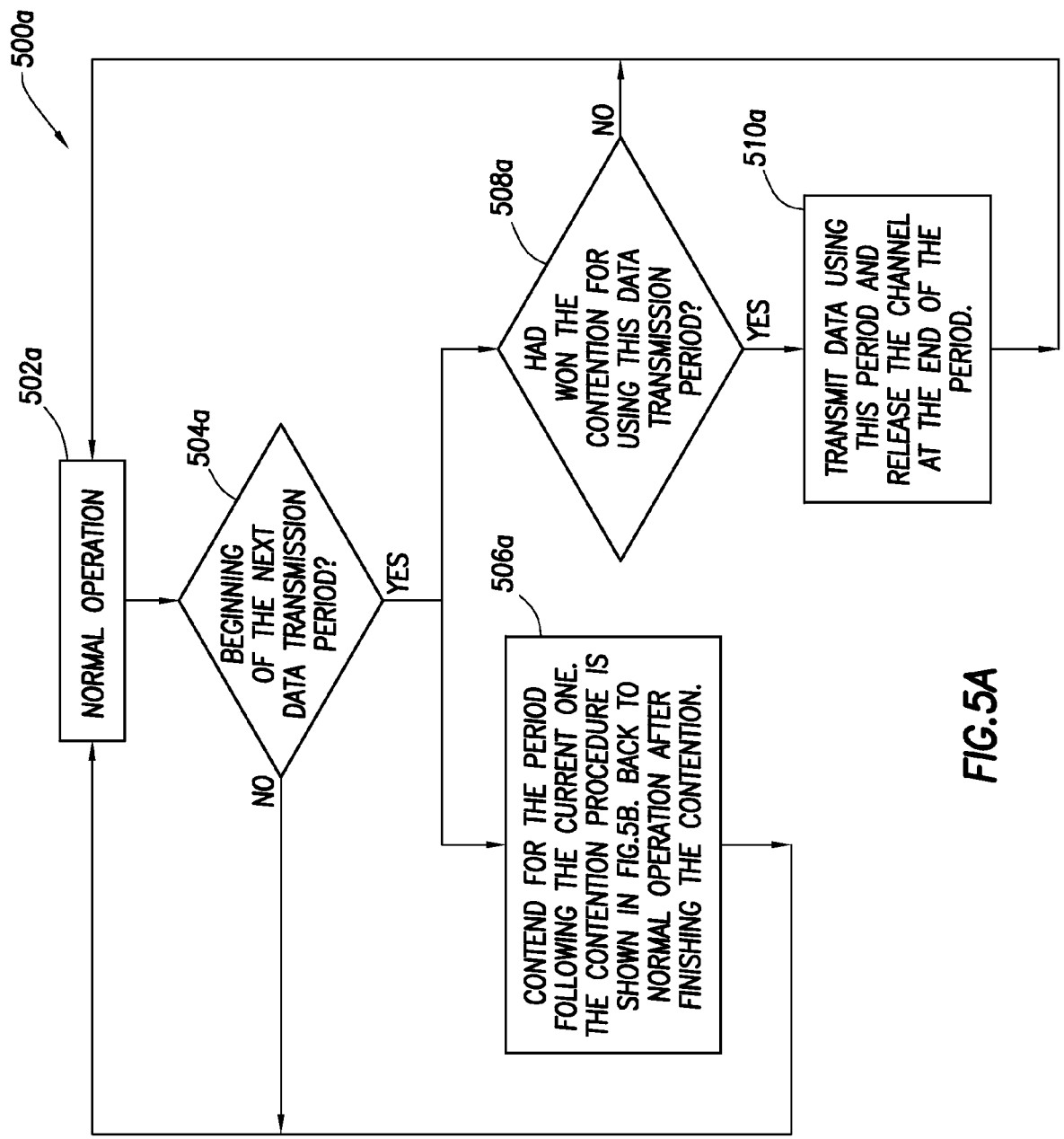
FIGS. 5A and 5B are related flow charts depicting example methods for contention resolution, in accordance with a second example embodiment of the present invention.
Figure 5B:
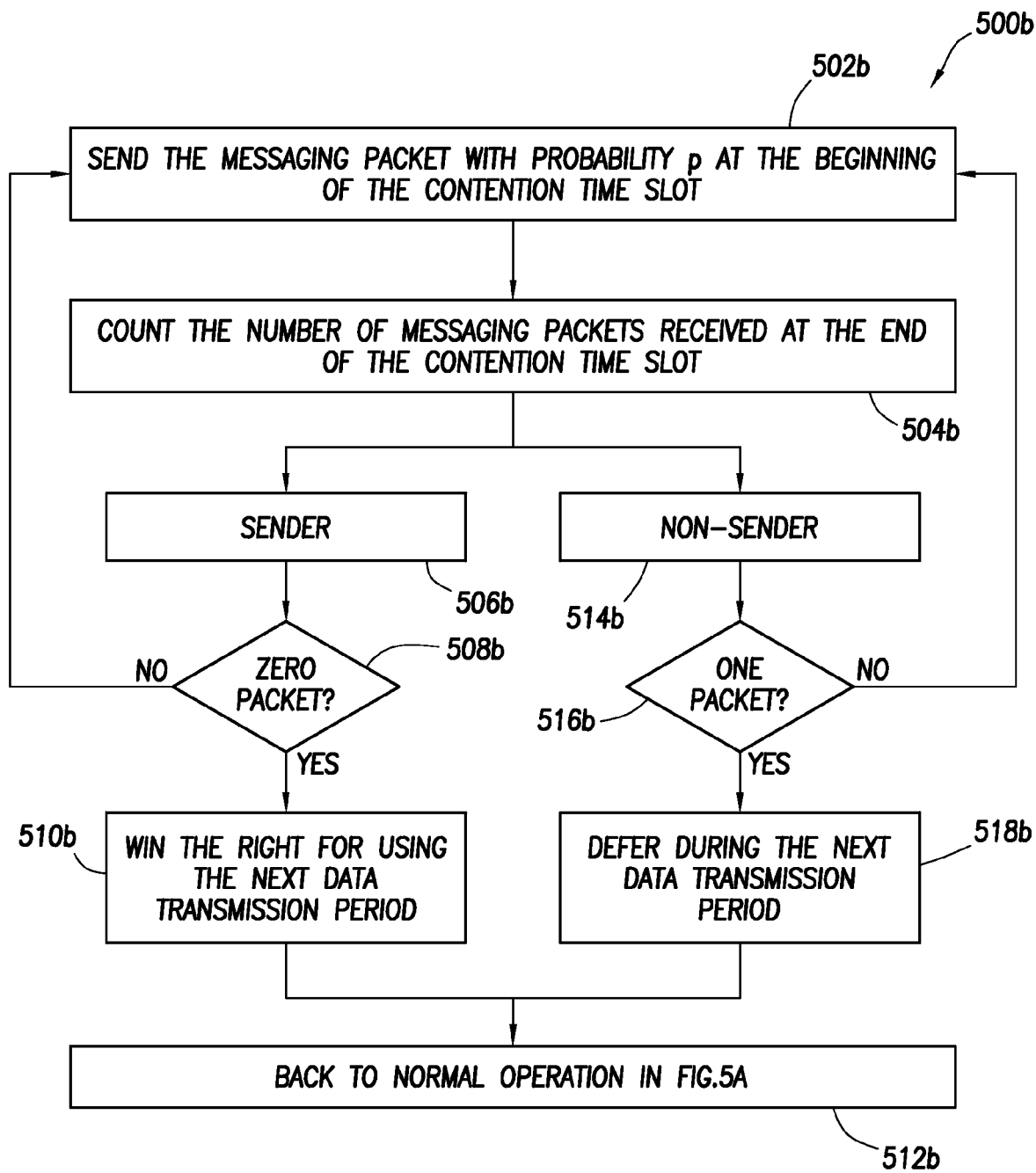

Also, as illustrated by the example diagram 400 depicted in FIG. 4, note that in one example embodiment, method 300 resolves contention issues in different time slots than the data transmissions. However, it should be understood that the present invention is not intended to be so limited, and the contention issues may be resolved concurrently with data transmission, in order to avoid unnecessary data transmission delays. In this regard, FIGS. 5A and 5B depict related flow charts of example methods 500a, 500b for contention resolution, in accordance with a second example embodiment of the present invention. Notably, for this example embodiment, methods 500a, 500b can be used to perform contention resolution concurrently or in parallel with transmissions of data over the air.

For this example embodiment, methods 500a and 500b may be used to implement contention resolution in example system 200 shown in FIG. 2. Essentially, for this example embodiment, methods 500a, 500b illustrate that the contention and data transmission processes may be executed in parallel. As such, the contention process is executed in advance over the backhaul, and not over the air. The radio channel can be continuously occupied from one data transmission period to the next. At the beginning of each data transmission period, the BS that won the contention during the previous data transmission period can use the radio channel. In parallel with the radio channel transmissions, all of the BSs can contend for the ownership of the radio channel for the next data transmission period. In this regard, for this example embodiment, each contention cycle shall be completed relatively quickly and prior to the beginning of the next data transmission period.

Specifically, referring now to FIGS. 2 and 5A for this example embodiment, method 500a begins with the BS involved operating in a normal mode (step 502a). Next, the BS determines whether or not the next data transmission period has begun (step 504a). If the BS determines that the next data transmission period has not begun, then the BS can continue with its normal operation, and the flow returns to step 502a.

If, at step 504a, the BS determines that the next data transmission period has begun, then the flow proceeds simultaneously to steps 506a and 508a. In other words, these steps may be performed in parallel. At step 506a, the BS involved can contend for the data transmission period following the current one, and the flow proceeds to the exemplary contention method 500b shown in FIG. 5B.

Referring now to FIGS. 2 and 5B for this example embodiment, method 500b begins with the contending BS sending out a short messaging "claim" packet (e.g., using a multicast transmission) with a probability, p, to all of the other BSs in the contention set (step 502b). For this example embodiment, the "claim" packet can be conveyed from the contending BS to the other BSs via first network portion 202 and two of the links 210, 212, 214.

Figure 6:
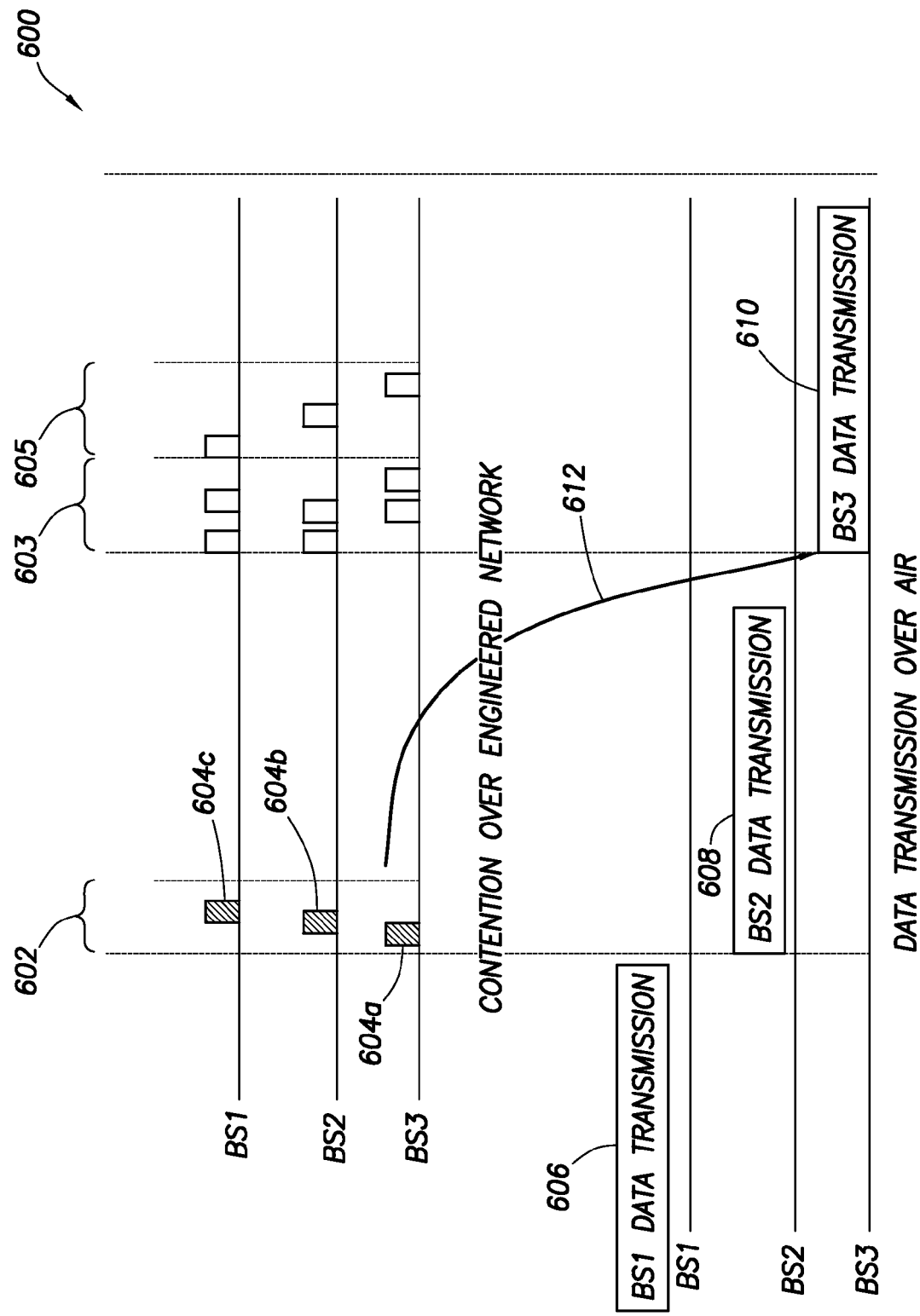
FIG. 6 is a pictorial diagram depicting a plurality of "claim" packet transmissions and receptions and data transmissions that illustrate principles of the exemplary method shown in FIGS. 5A and 5B.

FIG. 6 is a pictorial diagram 600 depicting a plurality of "claim" packet transmissions and receptions and data transmissions that illustrate principles of exemplary methods 500a and 500b shown in FIGS. 5A and 5B. Referring to FIGS. 2, 5A, 5B and 6 for this illustrative example, BS1, BS2 and BS3 in FIG. 6 may represent BS 204, BS 206 and BS 208, respectively, shown in FIG. 2. Also, a plurality of contention periods (e.g., associated with predetermined time slots) 602, 603, 605 are shown, along with a plurality of data transmission periods 606, 608, 610. For this example embodiment, the duration of each data transmission 606, 608, 610 is set equal to a predetermined time period, $T_p$. Thus, for this example, the contention resolution cycles are performed successively, and each contention resolution cycle is performed only once every $T_p$. However, note that it is also possible to perform a plurality of contention resolution cycles within one $T_p$. In any event, for design purposes, the value of $T_p$ may be selected so that $T_p$ is a long enough time period to support a meaningful data load and a high probability of success in resolving the contention. Otherwise, the next time period could be wasted if the contention were not resolved. On the other hand, the value of $T_p$ should be selected so that $T_p$ is a short enough time period to support a suitable level of Quality of Service (QoS) for all of the contenders involved.

For this illustrative example, during a first contention period/time slot 602, BS3 is shown transmitting a "claim" packet 604a. Also, BS2 is shown receiving the "claim" packet 604b that was transmitted by BS3, and BS1 is shown receiving the same "claim" packet 604c that was transmitted by BS3 and received by BS2.

Returning to method 500b, each BS in the contention set counts the number of "claim" packets received during the contention period/time slot involved (step 504b). For example, during contention period 602, BS1 has received one "claim" packet 604c, BS2 has received one "claim" packet 604b, and BS3 has received no "claim" packet. Next, each (sender) BS that transmitted a "claim" packet during that contention period/time slot determines whether or not it has received a "claim" packet from another BS (step 506b). For example, the sender BS may check to determine if it received no "claim" packets during the contention period (step 508b). If the sender BS determines that it received one or more "claim" packets during that contention period, then it may be assumed that a collision of those "claim" packets has occurred. Then, the sender BS can wait for another contention period to begin, and the flow returns to step 502b.

Returning to step 508b, if the sender BS determines that it received no "claim" packet during the contention period involved, then the sender BS can assume that it has won the right to use the channel during the next data transmission period (step 510b). The flow then proceeds to step 512b, and returns to step 502a in FIG. 5A.

Returning to step 504b in FIG. 5B, each (non-sender) BS that did not transmit a "claim" packet during the contention period involved, determines whether or not it has received a "claim" packet from another BS (step 514b). Specifically, the non-sender BS checks to determine if it received one "claim" packet during the contention period involved (step 516b). If the non-sender BS determines that it received one "claim" packet during that contention period/time slot, then the non-sender BS defers its claim, and holds off until the end of the next data transmission period (step 518b). In this case, the flow proceeds to step 512b and returns to step 502a in FIG. 5A. However, if at step 516b, that non-sender BS determines that it did not receive one "claim" packet during that contention period, then the flow returns to step 502b, and the non-sender BS can contend again.

Returning to step 508a in FIG. 5A, the BS involved determines whether or not it has won the contention to use the channel during the data transmission period involved. If the BS has not won this contention, then the flow returns to step 502a, and the BS resumes its normal operation. However, if (at step 508a) the BS involved determines that it has won the contention to use the channel during the data transmission period involved, then the BS can transmit data during that data transmission period, and release the channel at the end of that period (step 510a). Thus, the present invention also provides an approach for contention resolution, whereby the contention resolution cycles may be performed concurrently or in parallel with the transmissions of data.

The example diagram depicted in FIG. 6 illustrates key principles of exemplary methods 500a, 500b. For example, during contention period/time slot 602, BS3 is a sender BS, and BS1 and BS2 are non-sender BSs. As such, during contention period/time slot 602, sender BS3 has received no "claim" packet from another BS, non-sender BS2 has received one "claim" packet from another BS, and non-sender BS1 has received one "claim" packet from another BS. Consequently, in accordance with exemplary methods 500a, 500b, BS3 has won the contention, but has waited until after the end of the current data transmission period 608 to use that channel during data transmission period 610 (as indicated by the arrow 612).

FIGS. 7A through 7D are related diagrams depicting example messaging formats 700a through 700d, which may be used for coordinating the assignments of communication network resources, in accordance with one or more example embodiments of the present invention. In one example embodiment, messaging formats 700a through 700d represent an IP-based messaging protocol, which may be used for coordinating the assignments of frequencies for a plurality of BSs in a WRAN. For example, messaging formats 700a through 700d may be used, respectively, as a channel use request, channel use response, channel use update, and channel use update acknowledgment message format for network signaling in a CR-based network to coordinate the frequency assignments of a plurality of BSs, which enables the BSs to share unused frequency channels.

Figure 8:
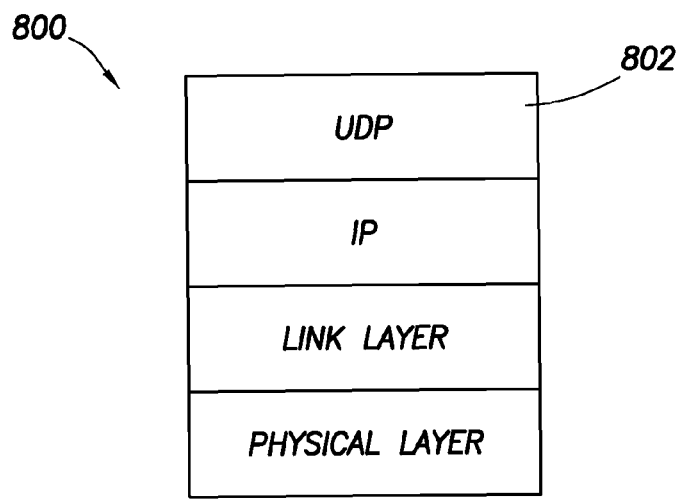
FIG. 8 is a diagram depicting an example of the layers for a protocol, which can be used to implement an example embodiment of the present invention.

For this example embodiment, it may be assumed that all of the BSs in the WRAN are connected together via an IP network. For example, referring to the example embodiment depicted in FIG. 2, such a WRAN may be represented by BSs 204, 206 and 208, such an IP network may be represented by first network portion 202, and such network connections may be represented by links 210, 212 and 214. A diagram depicting an example of the layers for such a protocol (protocol stack) is shown in FIG. 8.

Additionally, for this example embodiment, it may be assumed that the messaging protocol depicted in FIGS. 7A through 7D uses a specific UDP port (e.g., layer 802) so that the messages can be identified. It may also be assumed that each BS in the WRAN is associated with a specific 4-byte identifier (e.g., IP address), each BS knows the identifiers (e.g., IP addresses) of its neighboring BSs, and each BS knows the active sets of its neighboring BSs (e.g., the channels that its neighbors are currently using). For example, each BS can determine the active sets of its neighboring BSs with inter-BS signaling, or some other suitable technique. Furthermore, it may be assumed that each BS in the WRAN can observe the frequency spectrum for unused channels (e.g., unused television channels), and can assign unused channels to the users' devices (e.g., CPEs) in its coverage area using, for example, a Time-Division Multiplexing (TDM) technique. This technique allows a user's device (e.g., CPE) to use a channel in specific time slots for downstream reception or upstream transmission.

Referring to FIGS. 7A through 7D for this example embodiment, if a BS wants to assign a user device (e.g., CPE) to a channel that is currently being used by a neighboring BS, then the first BS sends a channel use request message 700a to the neighboring BS (e.g., via the IP network). The channel use request message can be used to request that a time slot on a specific channel be reserved. The sending BS may make a number of such requests in a single channel use request message.

For this example embodiment, the channel use request message 700a includes a 4-byte identifier field 702a, which identifies the sending BS. Also, channel use request message 700a includes an 8-bit synchronization code field 704a, which the neighboring BS includes with its response in a channel use response message 700b (e.g., element 704b). In its response message, the neighboring BS is identified as the sending BS (e.g., element 702b). The synchronization code field 704a, 704b in each message 700a, 700b enables the sending BS to correlate the request and response messages sent and received. An identifier field and synchronization code field 702c-d, 704c-d is included for similar purposes in the channel use update message 700c and channel use update acknowledgment message 700d. Also, for this example embodiment, each message 700a-d includes a respective protocol identifier field 706a-d (e.g., type of protocol function involved) and message identifier field 708a-d (e.g., type of message involved).

When a neighboring BS receives a channel use request message 700a, that neighboring BS can send a channel use response message 700b to the requesting BS. The channel use response message 700b includes a plurality of fields 710b that list the identities of the channels and time slots that the neighboring BS considers shared with the requesting BS. For this example embodiment, these fields are also included as elements 710a and 710c, respectively, in messages 700a and 700c. If a time slot is not included in the channel/time slot fields 710b of the channel use response message 700b, the requesting BS knows that time slot is considered reserved by the neighboring BS, and the requesting BS may not use that time slot.

Also, in response to receiving the channel use request message 700a, the neighboring BS will not assign any of its users' devices (CPEs) to the shared time slots until the neighboring BS receives a channel use update message 700c from the requesting BS, which indicates that the time slot(s) involved is/are now released. The requesting BS can indicate this condition by identifying the released time slot(s) in the channel/time slot list fields 710c of the channel use update message 700c. If either the requesting BS or neighboring BS determines that it no longer needs to use a time slot on a shared channel, that BS can send a channel use update message 700c to its neighboring BSs, which indicates that the sending BS is no longer using that time slot on the shared channel. In response to receiving a channel use update message 700c, each neighboring BS can send a channel use update acknowledgment message 700d, which indicates that the neighboring BS received the channel use update message 700c.

Figure 9B:
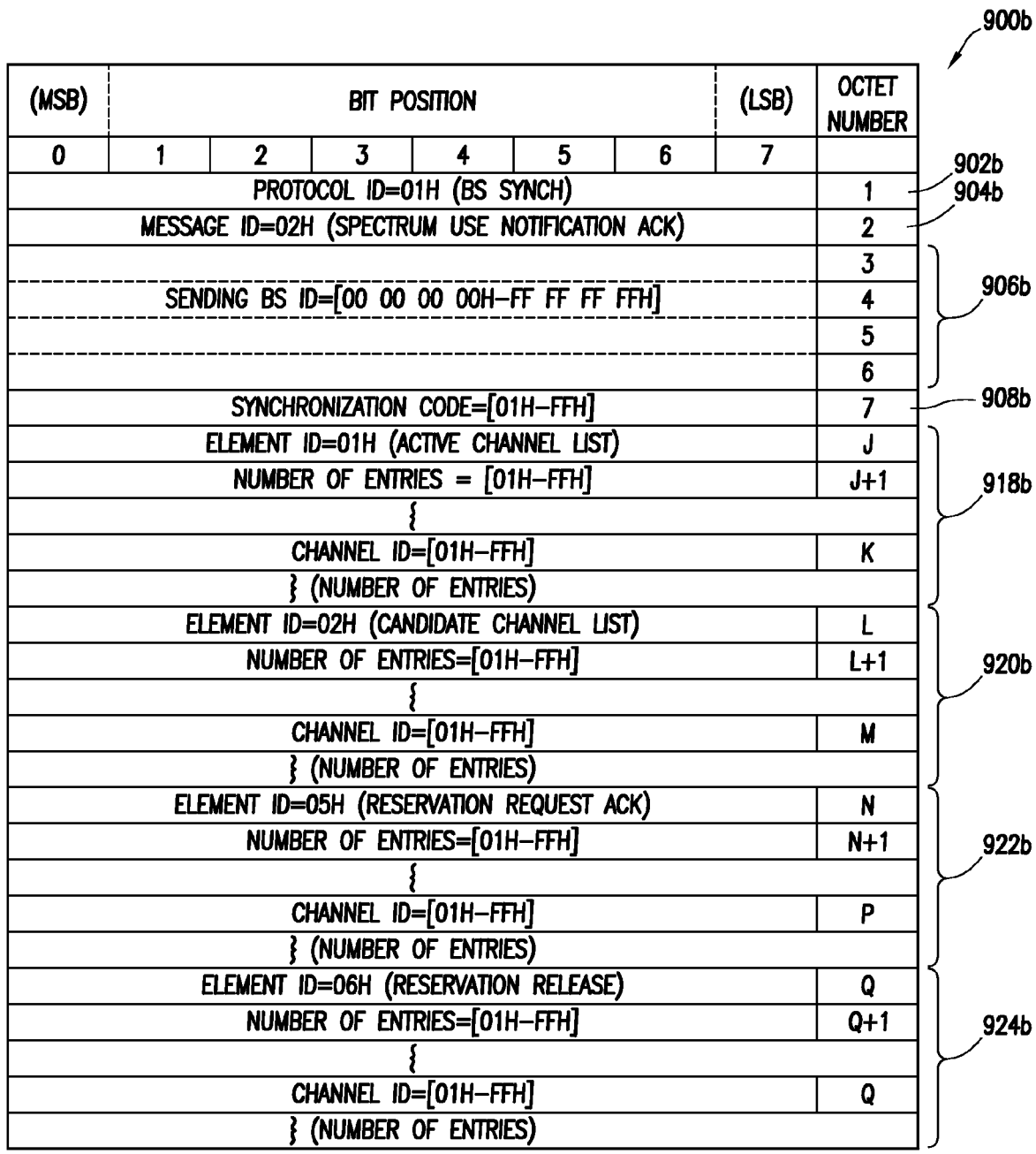

FIGS. 9A and 9B are related diagrams depicting example messaging formats 900a and 900b, which may be used for coordinating the assignments of communication network resources, in accordance with one or more example embodiments of the present invention. In one example embodiment, messaging formats 900a and 900b represent an IP-based messaging protocol, which may be used for coordinating the assignments of frequencies for a plurality of BSs in a WRAN. For example, messaging formats 900a and 900b may be used, respectively, as a spectrum use notification message format and a spectrum use notification acknowledgment message format for network signaling in a CR-based network to coordinate the frequency assignments of a plurality of BSs, which enables the BSs to share unused frequency channels.

For this example embodiment, it may be assumed that all of the BSs in the WRAN are connected together via an IP network. Again, referring to the example embodiment depicted in FIG. 2, such a WRAN may be represented by BSs 204, 206 and 208, such an IP network may be represented by first network portion 202, and such network connections may be represented by links 210, 212 and 214. Also, a diagram depicting an example of the layers for such a protocol (protocol stack) is shown in FIG. 8.

Additionally, for this example embodiment, it may be assumed that the messaging protocol depicted in FIGS. 9A and 9D uses a specific UDP port (e.g., layer 802) so that the messages can be identified. It may also be assumed that each BS in the WRAN is associated with a specific 4-byte identifier (e.g., IP address), and each BS knows the identifiers (e.g., IP addresses) of its neighboring BSs. A BS may send the spectrum use notification message 900a periodically or aperiodically to its neighboring BSs.

Referring to FIGS. 9A and 9B, for this example embodiment, the spectrum use notification message 900a and spectrum use notification acknowledgment message 900b each includes a respective protocol identifier field 902a, 902b (e.g., type of protocol function involved), message identifier field 904a, 904b (e.g., type of message involved), sending BS identifier field 906a, 906b, and synchronization code field 908a, 908b. The spectrum use notification message 900a also includes an active channel list field 910a, a candidate channel list field 912a, a reservation request field 914a, and a reservation revoke field 916a. The spectrum use notification acknowledgment message 900b also includes an active channel list field 918b, a candidate channel list field 920b, a reservation request acknowledgment field 922b, and a reservation release field 924b.

Thus, the spectrum use notification message 900a includes the identity of the sending BS, a list of the active channels (e.g., channels being used by the CPEs that are being serviced by that BS), and a list of the candidate channels (e.g., channels that the BS and the CPE's under its control have determined are available for use). Note that the BS and CPEs may use a conventional technique to determine the availability of the channels. By using the spectrum use notification message 900a, a BS and its neighbors can stay informed about each other's active and candidate channel sets. Consequently, the channel assignment etiquette of the BS will be improved. For example, if a CPE requests service from a BS, the BS may choose to assign a channel that appears in its candidate set, but not in the candidate set of any of its neighbors, in order to avoid any possible interference with neighboring cells. The BS can then assign the channel to the CPE, and send a spectrum use notification message 900a to the surrounding BSs that includes the identity of the newly assigned channel in its active list. The neighboring BSs then know not to assign this channel.

When a BS receives a spectrum use notification message 900a from one of its neighbors, the BS may respond by sending a spectrum use notification acknowledgment message 900b to that neighbor. For this example embodiment, the spectrum use notification acknowledgment message 900b includes the sending BS's own active and candidate channel lists 918b, 920b. Since the spectrum use notification message 900a included a synchronization code 908a, when a BS sends a spectrum use notification acknowledgment message 900b, that acknowledgment message includes the same synchronization code as the spectrum use notification message that the BS is replying to, so the receiving BS can correlate its response with the original message.

FIG. 10 is a time sequence diagram depicting an example method 1000 for coordinating the assignments of communication network resources, in accordance with a second example embodiment of the present invention. Also, FIG. 11 is a pictorial diagram depicting an example network configuration 1100, which can be used to illustrate the exemplary method 1000 shown in FIG. 10. Referring to FIGS. 9A, 9B, 10 and 11, for this illustrative embodiment, note that network 1100 includes a first (heavily-loaded) BS1 with radio coverage over CPEs 1102 through 1112, and a second (lightly-loaded) BS2 with radio coverage over CPEs 1112 and 1114. Consequently, the heavily-loaded BS1 may determine that it will probably use the channels in its candidate list soon. This situation is not problematic unless one of those candidate channels also appears in a neighbor's candidate list. If such a neighbor is lightly-loaded, then it should avoid assigning this channel in the future.

Referring to method 1000, the heavily-loaded BS1 may send a spectrum use notification message 900a to its neighbors (step 1002), which requests that one or more of the channels in its candidate list be reserved for future use (e.g., candidate channels 2, 3 from BS2). The neighboring BSs (e.g., BS2) may or may not allow this channel reservation to occur. Thus, a neighboring BS (BS2) may reply with a spectrum use notification acknowledgment message 900b (step 1004), in which the neighboring BS indicates (in the reservation request acknowledgment field 922b) the candidate channel(s) it is allowing the requesting BS (BS1) to reserve for future use (e.g., candidate channel 3). The neighboring BS (BS2) then removes the reserved channel(s) from its candidate list.

At a future point in time, the neighboring BS may want to request that the channel reservation be released. In that case, for this example embodiment, the neighboring BS (BS2) may send a spectrum use notification message 900a to the reserving BS (step 1006), which indicates the reserved channel(s) in the reservation revoke field 916a. The reserving BS (BS1) acknowledges the release of the reservation by sending a spectrum use notification acknowledgment message 900b to the neighboring BS (step 1008), which indicates the released channel(s) in the reservation release field 924b (e.g., channel 3). The reserving BS (BS1) no longer considers the channel(s) reserved for its use, although the channel(s) may remain in that BS's candidate list (and also entered in the neighbor's candidate list).

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated.

What is claimed is:

1. A method for contention resolution in a communications network, the method comprising:
  transmitting, by a base station, a first contention message for a network resource during a first time interval for use of the network resource in the next time interval;
  counting, by the base station, a number of contention messages received during the same first time interval from other base stations contending for the next time interval;
  if one or more contention messages are received during the first time interval, deferring, by the base station, a use of the network resource in the communications network during the next time interval; and
  if one or more contention messages are not received during the first time interval, using, by the base station, the network resource during the next time interval,
  wherein the transmitting and determining are performed concurrently or in parallel with a use of the network resource by the base station during the first time interval, and the transmitting is not performed over the network resource for which contention is being performed.

2. The method of claim 1, further comprising:
  determining if the network resource is in use during the second time interval; and
  if the network resource is in use during the second time interval, using the network resource during a third time interval, the third time interval subsequent in time to the next time interval.

3. The method of claim 1, wherein transmitting, determining and deferring are performed in an IP network concurrently or in parallel with a transmission of data over a radio air interface.

4. The method of claim 1, wherein the first contention message is a first "claim" message transmitted by a first base station, the second contention message is a second "claim" message transmitted by a second base station, and the steps of the method are performed for the first base station.

5. The method of claim 1, wherein the first contention message is a first signaling message, and the second contention message is a second signaling message.

6. The method of claim 1, wherein the first contention message comprises a messaging packet or frame, the first time interval comprises a first contention time slot, and the next time interval comprises a second contention time slot.

7. The method of claim 1, wherein deferring further comprises transmitting a third contention message during a third time interval.

8. The method of claim 1, wherein the network resource is a frequency channel.

9. The method of claim 1, wherein the communications network comprises at least one of a wireless network and a wire line network, and the first contention message and second contention message are conveyed on an Internet Protocol (IP) data communication link.

10. The method of claim 1, wherein the communications network comprises a Cognitive Radio-based communications network that includes a plurality of base stations, a plurality of signaling messages are conveyed between the base stations using an Internet Protocol format, and the network resource comprises a channel within a frequency spectrum associated with broadcast television.

11. A method for contention resolution by a first device in a communications network, the method comprising:
  determining that a channel sharing contention condition exists;
  generating a random number associated with a predefined duration of a contention window;
  sending a first messaging packet or frame during a first contention time slot for using a network resource in the next contention time slot, the first messaging packet or frame associated with a predetermined probability value;
  counting a number of messaging packets or frames received from one or more other devices during the first contention time slot;
  if one or more messaging packets or frames are received from the one or more other devices, deferring use of a channel in contention during the next contention time slot; and
  if one or more messaging packets or frames are not received from the second device, using the channel in contention during the next contention time slot,
  wherein sending a first messaging packet or frame and determining if at least one messaging packet or frame was received from one or more other devices are performed concurrently or in parallel with a use of the channel in contention, and sending a first messaging packet or frame is not performed over the network resource for which contention is being performed.

12. The method of claim 11, further comprising:
  determining by the second device if the first messaging packet or frame has been received from the first device substantially at the end of the contention time slot; and
  if the first messaging packet or frame has been received, deferring use of the channel in contention by the second device.

13. The method of claim 11, wherein the method is performed in an IP network concurrently or in parallel with a transmission of data over a radio air interface.

14. The method of claim 11, wherein the first device comprises a first base station, the second device comprises a second base station, the communications network comprises a WRAN, and the first messaging packet or frame and the second messaging packet or frame are conveyed between devices using an Internet Protocol communication link.

15. The method of claim 11, wherein the random number comprises a random value, R, where R is associated with a range of values [0 CWin-1], and CWin is associated with a size of a contention window.

16. The method of claim 11, wherein deferring use of the channel in contention comprises waiting for the next contention time slot, and re-performing the method.

17. The method of claim 12, wherein the second device deferring use of the channel in contention comprises waiting for a release of the channel in contention, and re-performing the method.

18. A system for contention resolution in a communications network, the system comprising:
  a first base station in the communications network;
  a second base station in the communications network;
  a second network; and
  a plurality of communication links connected to the first base station, the second base station, and the second network, the plurality of communication links coupling the first base station to the second base station for communication, wherein the first base station is configured to:
    transmit, by the first base station, a first contention message during a first time interval for using a network resource in the next time interval;
    determine if a second contention message has been received during the first time interval by the second base station;
    if the second contention message has been received during the first time interval, defer a use of a network resource in the communications network during the next time interval; and
    if the second contention message has not been received during the first time interval, use the network resource during the next time interval,
  wherein the first base station is configured to transmit the first contention message and determine if the second contention message has been received concurrently or in parallel with a use of the network resource by the first base station during the first time interval, and transmission of the first contention messages is not performed over the network resource for which contention is being performed.

19. The system of claim 18, wherein the first base station is further configured to:
  determine if the network resource is in use during the next time interval; and
  if the network resource is in use during the next time interval, use the network resource during a third time interval, the third time interval subsequent in time to the next time interval.

* * * * *